(12) United States Patent
Amouie et al.

(10) Patent No.: US 12,348,880 B2
(45) Date of Patent: Jul. 1, 2025

(54) RAIL-SIDE INSPECTION ASSEMBLIES AND SYSTEMS

(71) Applicants: Norfolk Southern Corporation, Atlanta, GA (US); GEORGIA TECH RESEARCH CORPORATION, Atlanta, GA (US)

(72) Inventors: Mabby Nicholas Amouie, Atlanta, GA (US); Evan Thomas Gebhardt, Atlanta, GA (US); Colin Usher, Atlanta, GA (US); Alex Samoylov, Atlanta, GA (US); John Hoang, Atlanta, GA (US); Sean Thomas, Atlanta, GA (US); Parth Mandrekar, Atlanta, GA (US); Brian Thomas Yeager, Atlanta, GA (US); Thomas Samuel Fox, Atlanta, GA (US)

(73) Assignee: Norfolk Southern Corporation & Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/829,200

(22) Filed: Sep. 9, 2024

(65) Prior Publication Data
US 2025/0088760 A1    Mar. 13, 2025

Related U.S. Application Data

(60) Provisional application No. 63/582,165, filed on Sep. 12, 2023, provisional application No. 63/581,554, filed on Sep. 8, 2023.

(51) Int. Cl.
H04N 23/90    (2023.01)
B61L 27/57    (2022.01)
(Continued)

(52) U.S. Cl.
CPC .............. *H04N 23/90* (2023.01); *B61L 27/57* (2022.01); *H04N 7/188* (2013.01); *H04N 23/51* (2023.01); *H04N 23/52* (2023.01); *H04N 23/56* (2023.01)

(58) Field of Classification Search
CPC ........ H04N 23/90; H04N 23/51; H04N 23/56; H04N 23/52; H04N 7/188; B61L 27/57
(Continued)

(56) References Cited

U.S. PATENT DOCUMENTS 4,915,504 A    4/1990  Thurston
5,793,492 A *  8/1998  Vanaki ................. G01B 11/105
                                                    356/613

(Continued)

FOREIGN PATENT DOCUMENTS

CN    111483496 A     8/2020
CN    111923962 A    11/2020
(Continued)

OTHER PUBLICATIONS

Non-Final Office Action For U.S. Appl. No. 18/829,194 dated Nov. 18, 2024, 18 pages.
(Continued)

*Primary Examiner* — Matthew David Kim
(74) *Attorney, Agent, or Firm* — Bradley Arant Boult Cummings LLP; Daniel E. Sineway, Esq.

(57) ABSTRACT

An inspection assembly can comprise a first camera, a second camera, one or more lights, and a housing. The first camera can be angled at least partially in a vertical direction and at least partially in a horizontal direction to thereby be configured to capture images of a target region in a three-dimensional space from a first viewpoint. The second camera can be positioned apart from the first camera, angled at least partially in the vertical direction and at least partially
(Continued)

in the horizontal direction, and directed to the target region from a second viewpoint that is different from the first viewpoint. The housing can comprise a base and a shroud and can be configured to attach to one or more rail ties and to at least partially envelop the first camera and the second camera.

22 Claims, 14 Drawing Sheets

(51) Int. Cl.
  *H04N 7/18* (2006.01)
  *H04N 23/51* (2023.01)
  *H04N 23/52* (2023.01)
  *H04N 23/56* (2023.01)
(58) Field of Classification Search
  USPC .......................................................... 348/159
  See application file for complete search history.

(56) References Cited

U.S. PATENT DOCUMENTS

| | | | |
|---|---|---|---|
| 6,813,581 B1* | 11/2004 | Snyder | G01K 7/42 702/179 |
| 6,909,514 B2* | 6/2005 | Nayebi | B61K 9/12 356/601 |
| 7,681,443 B2* | 3/2010 | Kilian | G01M 17/013 73/146 |
| 7,714,886 B2 | 5/2010 | Kilian et al. | |
| 7,715,026 B2 | 5/2010 | Nayebi | |
| 8,289,526 B2 | 10/2012 | Kilian et al. | |
| 8,480,008 B1* | 7/2013 | Arnold | E01B 7/22 238/327 A |
| 8,668,136 B2 | 3/2014 | Ahern et al. | |
| 8,780,189 B2* | 7/2014 | Kilian | G01P 3/38 250/559.22 |
| 8,934,007 B2 | 1/2015 | Snead | |
| 9,033,219 B2 | 5/2015 | Schoner et al. | |
| 9,073,559 B2 | 7/2015 | Kilian et al. | |
| 9,129,248 B2 | 9/2015 | Reynolds et al. | |
| 9,438,754 B2 | 9/2016 | Schoner et al. | |
| 9,516,199 B2 | 12/2016 | Kilian et al. | |
| 9,625,607 B2 | 4/2017 | Tudor et al. | |
| 9,671,191 B1* | 6/2017 | Sullivan | F41G 1/467 |
| 9,709,394 B2 | 7/2017 | Schoner et al. | |
| 9,836,893 B2 | 12/2017 | Chundru et al. | |
| 10,513,279 B2 | 12/2019 | Mulligan | |
| 10,523,858 B1* | 12/2019 | Arcaini | B61L 25/021 |
| 10,984,521 B2 | 4/2021 | Kohler et al. | |
| 11,107,233 B2 | 8/2021 | Saniei et al. | |
| 11,172,107 B1 | 11/2021 | Hoeppner | |
| 11,235,788 B2 | 2/2022 | Snyder et al. | |
| 11,285,980 B2 | 3/2022 | Popplewell | |
| 11,423,559 B2 | 8/2022 | Kohler | |
| 11,620,743 B2 | 4/2023 | Kohler et al. | |
| 11,688,169 B1 | 6/2023 | Dryer et al. | |
| 11,763,480 B2 | 9/2023 | Saniei et al. | |
| 11,776,145 B2 | 10/2023 | Kohler | |
| 11,861,509 B2 | 1/2024 | Neal, Jr. et al. | |
| 11,891,098 B1 | 2/2024 | Smythe et al. | |
| 11,932,290 B2 | 3/2024 | Davis et al. | |
| 11,974,035 B1 | 4/2024 | Buschelman | |
| 12,033,312 B2 | 7/2024 | Kohler et al. | |
| 2004/0263624 A1 | 12/2004 | Nejikovsky et al. | |
| 2005/0253926 A1 | 11/2005 | Chung et al. | |
| 2006/0276985 A1 | 12/2006 | Xu et al. | |
| 2007/0040911 A1* | 2/2007 | Riley | H04N 7/181 348/E7.086 |
| 2010/0100275 A1* | 4/2010 | Mian | G01M 17/08 382/284 |
| 2012/0113259 A1* | 5/2012 | Jie | H04N 7/181 382/250 |
| 2013/0054158 A1 | 2/2013 | Toms | |
| 2016/0096536 A1 | 4/2016 | Toms | |
| 2017/0199215 A1* | 7/2017 | Arcaini | G01P 3/50 |
| 2018/0222498 A1* | 8/2018 | Kelley | G01H 9/004 |
| 2018/0237041 A1* | 8/2018 | Mesher | G06T 7/001 |
| 2019/0061791 A1* | 2/2019 | Yaktine | G01J 5/0804 |
| 2019/0094154 A1* | 3/2019 | Iler | G01N 21/952 |
| 2019/0260972 A1* | 8/2019 | Behety | H04N 23/695 |
| 2020/0070862 A1* | 3/2020 | Bilodeau | B61L 1/06 |
| 2020/0408682 A1* | 12/2020 | Mian | G01N 21/47 |
| 2021/0058588 A1* | 2/2021 | Abreo | H04N 23/741 |
| 2021/0403060 A1 | 12/2021 | Pertosa | |
| 2022/0377251 A1* | 11/2022 | Grata | H04N 23/51 |
| 2023/0194746 A1 | 6/2023 | Morton | |
| 2023/0410342 A1 | 12/2023 | Kohler | |
| 2023/0410354 A1 | 12/2023 | Saniei et al. | |
| 2024/0004775 A1 | 1/2024 | Liu | |
| 2024/0035931 A1 | 2/2024 | Grata | |
| 2024/0043043 A1 | 2/2024 | Brooks et al. | |
| 2024/0137635 A1 | 4/2024 | Buschelman | |
| 2024/0236464 A9 | 7/2024 | Buschelman | |

FOREIGN PATENT DOCUMENTS

| | | |
|---|---|---|
| CN | 111942434 A | 11/2020 |
| WO | 9532581 A1 | 11/1995 |
| WO | 2022192962 A1 | 9/2022 |
| WO | 2024050200 A1 | 3/2023 |
| WO | 2024050201 A1 | 3/2024 |
| WO | 2024196402 A1 | 9/2024 |

OTHER PUBLICATIONS

Non-Final Office Action For U.S. Appl. No. 18/829,189 dated Nov. 4, 2024, 18 pages.

Chong et al., S.Y. A Review of Health and Operation Monitoring Technologies for Trains, Google Scholar, Smart Structures and Systems, vol. 6, No. 9, 2010, pp. 1079-1105. (Year: 2010).

Gao et al., L. Anomaly Detection of Trackside Equipment Based on GPS and Image Matching, IEEE Access, vol. 6, Jan. 2020, pp. 17346-17355.

Non-Final Office Action for U.S. Appl. No. 18/829,199, mailed Dec. 27, 2024, 12 Pages.

Notice of Allowance for U.S. Appl. No. 18/829,216 dated Dec. 12, 2024, 2 pages.

Qiushi et al., "M. Composite Railway Health Monitoring System based on Fiber Optic Bragg Grating Sensing Array", IEEE Far East Forum on Nondestructive Evaluation/Testing, Jun. 2014, pp. 259-264.

* cited by examiner

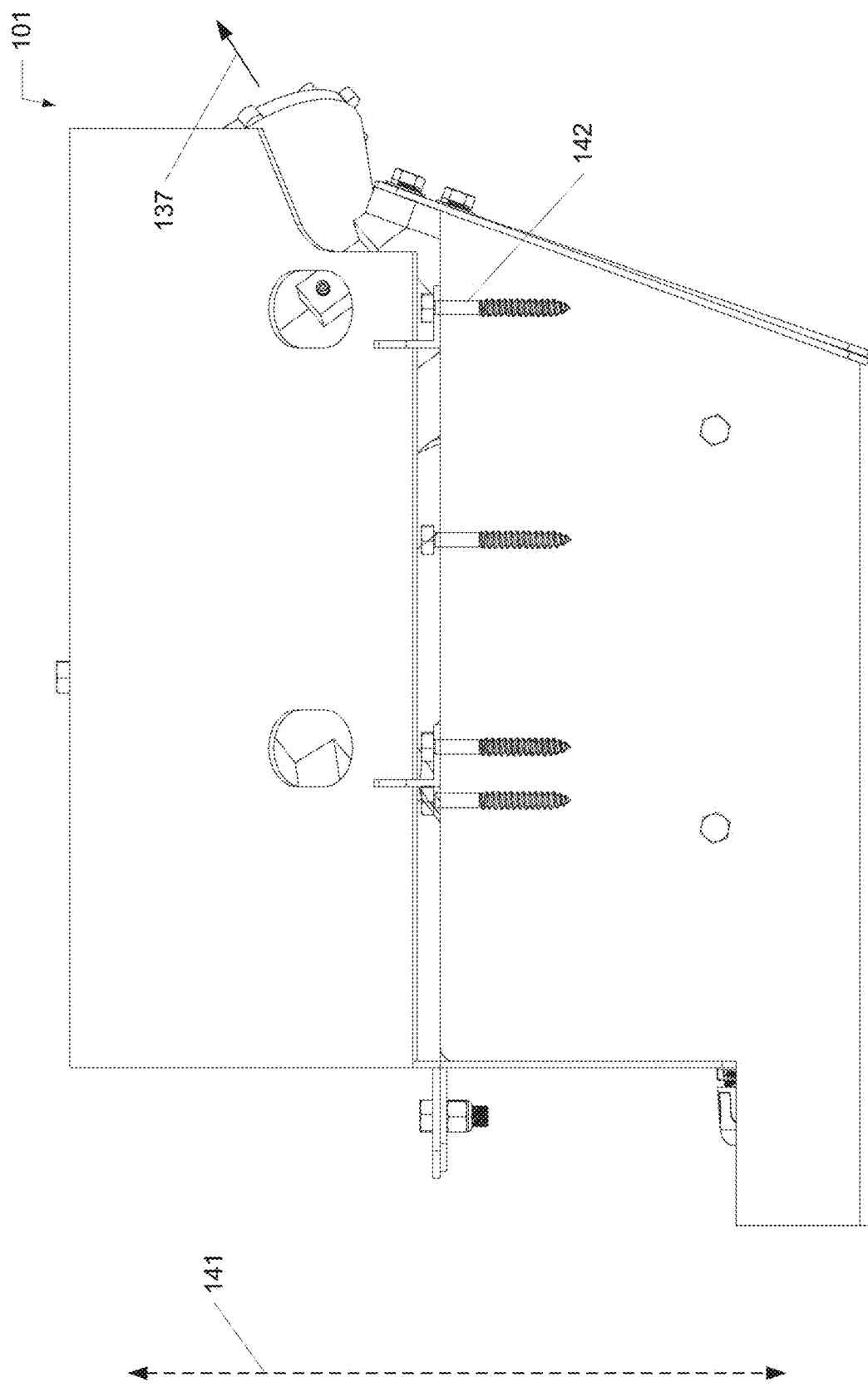

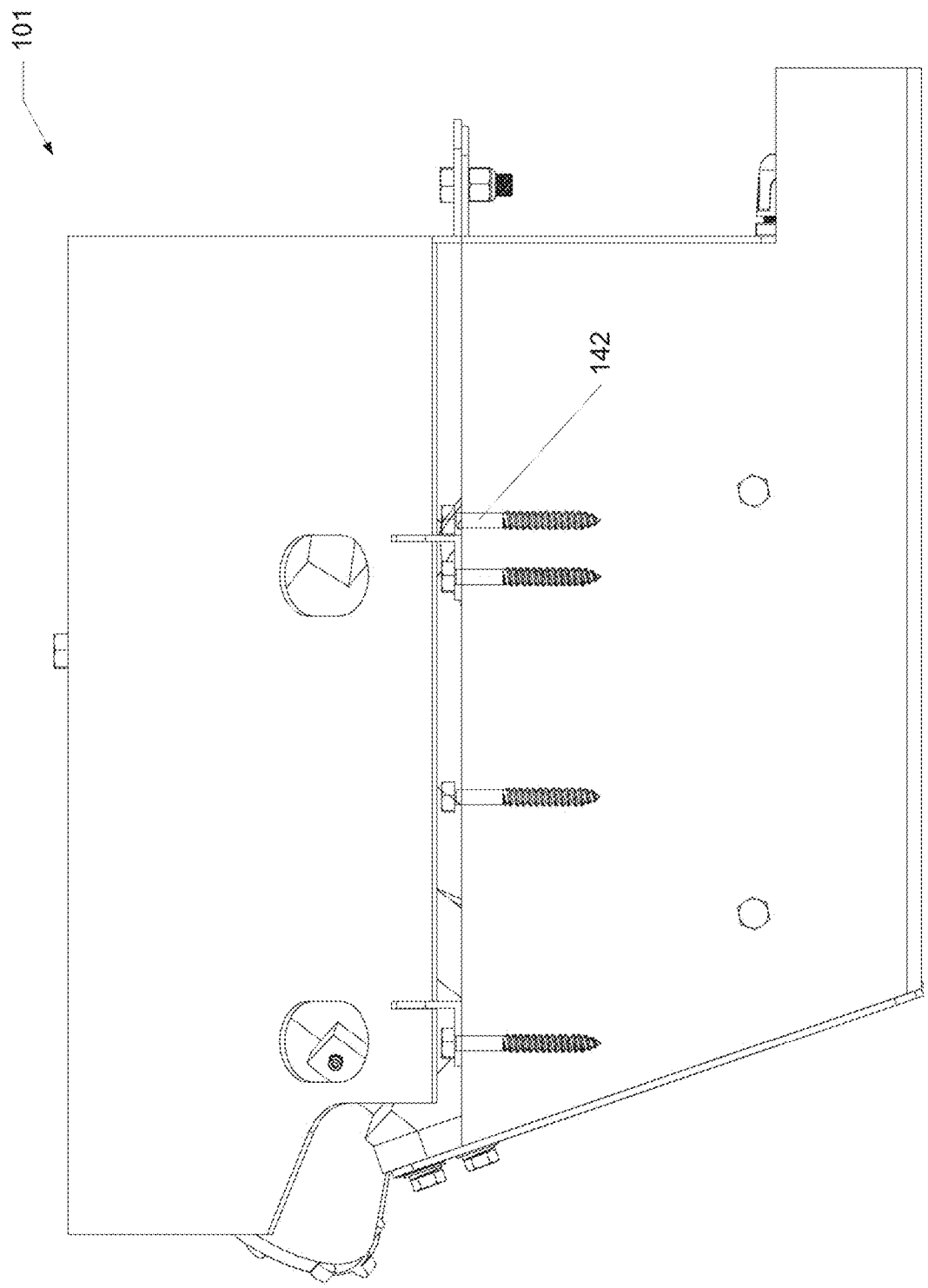

RAIL-SIDE INSPECTION ASSEMBLIES AND SYSTEMS

CROSS-REFERENCE TO RELATED APPLICATIONS

This application claims the benefit of, and priority to, U.S. Provisional Patent App. No. 63/581,554, filed on Sep. 8, 2023, and entitled "APPARATUSES, SYSTEMS, AND METHODS FOR MONITORING TRAIN RAILCARS," and U.S. Provisional Patent App. No. 63/582,165, filed on Sep. 12, 2023, and entitled "APPARATUSES, SYSTEMS, AND METHODS FOR MONITORING TRAIN RAILCARS," the disclosures of which are incorporated by reference in their entireties as if the same were fully set forth herein.

TECHNICAL FIELD

This application generally relates to systems and methods for inspecting passing vehicles and, more specifically, to identify any defects or potential defects in various components and/or systems of a railcar and/or train, such as cross-key systems, as a non-limiting example.

BACKGROUND

Trains are vital transportation mediums used to distribute a large quantity of goods around the world. Due to their robust nature and efficiency, trains and their sub-components, such as railcars and locomotives, are commonly used repeatedly throughout their lifetime. Repeated and constant use of a particular train can cause the particular train to experience degradation over time. The trains are traditionally inspected by individuals at rail yards for any particular issue and to prevent safety and functionality hazards. These inspections can be costly due to the manpower necessary to properly complete the inspections, the amount of time it takes to inspect the trains, and the lost revenue associated with keeping the train in the railyard. Additionally, humans can occasionally miss issues that can lead to safety hazards and/or functional issues with the train.

Further, some existing attempts to automate inspections of moving objects, particularly railcars, can be inadequate because they are unable to capture images that clearly illustrate views necessary to detect certain defects.

Therefore, there is a long-felt but unresolved need for a system, assembly, and method that monitors moving objects (e.g., trains), minimizes or otherwise reduces the man-hours necessary for inspecting subject objects, identifies a wide variety of issues associated with the objects, records data associated with the objects, and/or generates insights associated with the objects.

BRIEF SUMMARY OF THE DISCLOSURE

Briefly described, and according to one example, aspects of the present disclosure generally relate to systems, assemblies, and/or devices, and methods thereto, for capturing images of passing railcars (e.g., one or more railcars of a train) or components thereof and/or gathering additional data relating to the railcar and/or the railcar component. As one non-limiting example, the disclosed technology can be used to capture images of a railcar's cross-key. The disclosed technology includes a system comprising two or more rail-side inspection assemblies. For example, a first rail-side inspection assembly can be positioned on a first side of a train track (e.g., outside the rails), and a second rail-side inspection assembly can be positioned on a second side of the train track (e.g., outside the rails and/or opposite the first-rail-side inspection assembly). Each of the rail-side inspection assemblies can include various cameras, sensors, and/or lights to gather data (e.g., images) relating to one or more specific assemblies, sub-assemblies, and/or components of a passing railcar, such as a cross-key component of a passing railcar, as a non-limiting example. The cross-key component can be located on the side of the train coupler. The rail-side inspection assembly can be angled upwardly towards the lower portion of the railcar, such that the rail-side inspection assembly is positioned and oriented to capture images and/or other data from a low vantage of relative to the cross-key component of the train coupler (or any other intended assembly, sub-assembly, and/or component).

The rail-side inspection assembly can include one or more cameras, such as one or more area-scan cameras and/or one or more line-scan cameras. The cameras can include machine vision cameras with high sensitivity. For example, the cameras can include a highly sensitive sensor, which can be configured to capture, gather, or otherwise obtain images at high speeds and resolution. The rail-side inspection assembly can include one or more lights. The lights and/or the cameras can be arranged in an array (or multiple arrays). For example, the rail-side inspection assembly can include a camera positioned between two adjacent lights. The lights can be oriented so as to illuminate a specific three-dimensional location corresponding to a target region of a passing railcar, with the target assembly, sub-assembly, and/or component (which is referenced herein as the "target component" for simplicity) being located within the target region as a given railcar passes the rail-side assembly). The lights can be configured to illuminate the target region, and the camera can be configured to capture images of the target component with less than 2 mm of blur, as a non-limiting example. Alternatively or in addition, the camera can be configured to capture images of the target component with less than 5 mm of blur, less than 4 mm of blur, less than 3 mm or blur, less than 1 mm of blur, less than 0.5 mm of blur, in a range of between approximately 1 mm of blur and approximately 3 mm of blur, or in a range between approximately 2 mm of blur and approximately 5 mm of blur, as non-limiting examples. The rail-side inspection assembly can be configured to capture images and/or other data from railcars moving at speeds of up to 30 miles per hour (mph), up to 50 mph, up to 70 mph, or even up to 85 mph, as non-limiting examples, with the captured images being of sufficient clarity and focus to accurately and reliably detect defects or potential defects of a given target component.

The rail-side inspection assembly can include a protective enclosure, which can substantially or wholly envelop the camera(s) of the rail-side inspection assembly. The protective enclosures can protect each particular camera from debris and/or the elements. Alternatively or in addition, the protective enclosure can include an air assembly, which can be configured to generate an air curtain along the lens of the cameras (e.g., in front of the lens and/or a clear, protective material of the enclosure, perpendicular to the focal direction of the lens) to remove debris and other materials that may be present and/or to prevent dust, debris, or other materials from inhibiting the camera's view of the target component. The protective enclosure can fluidly connect to a compressed air source to provide compressed air for the air curtain. Alternatively or in addition, the protective enclosure can be in communication with a cooling source (e.g., a cooling loop, a heat pump, and/or any other cooling system or device) to cool the camera and/or other components of the rail-side inspection assembly (e.g., to keep the temperature of certain components within a functional and/or desired temperature range). The protective enclosure can be manufactured from steel to protect the various components of the disclosed technology.

The rail-side inspection assembly can include a dampening system. The dampening system can be configured to reduce the mechanical vibrations, and/or the effect thereof, induced by the passing railcar passes on the rail-side inspection assemblies. The dampening system can connect to the protective enclosure, as a non-limiting example. Alternatively or in addition, the rail-side inspection assembly can be mounted to the ties of a train track, such as by a mounting plate or a mounting enclosure, and the dampening system can be positioned between the mounting plate (or mounting enclosure) and the camera(s).

The cameras can each be angled such that the cameras and/or sensors are directed towards the target region of a given passing railcar. For example, the one or more cameras, one or more sensors, and/or one or more lights can be angled toward a longitudinal and/or central axis of the train tracks and in an upward direction such that the cameras, sensors, and/or lights are directed towards the target component of passing railcars.

The rail-side inspection assembly can be installed on (e.g., attached to) existing train tracks. For example, the rail-side inspection assembly can be attached to one or more rail ties. The rail-side inspection assembly can be installed outside the rails of train tracks (e.g., at or near an end of one or more rail ties). Alternatively or in addition, the rail-side inspection assembly can be positioned between the rails of train tracks. While the rail-side inspection assembly is described herein as being attached to (e.g., attachable to) rail ties, the disclosed technology is not so limited, and the rail-side inspection assembly can be installed in any other useful location (e.g., the ground, the ballast, another structure located proximate train tracks).

According to a first aspect, an inspection assembly, comprising: A) a first camera angled at least partially in a vertical direction and at least partially in a horizontal direction to thereby be configured to capture images of a target region in a three-dimensional space from a first viewpoint; B) a second camera positioned apart from the first camera, angled at least partially in the vertical direction and at least partially in the horizontal direction, and directed to the target region from a second viewpoint that is different from the first viewpoint; C) one or more lights; and D) a housing comprising a base and a shroud, the housing configured to attach to one or more rail ties and to at least partially envelop the first camera and the second camera.

According to a further aspect, the inspection assembly of the first aspect or any other aspect, wherein the shroud covers a rear of the first camera and a rear of the second camera and at least partially covers a top of the first camera and a top of the second camera.

According to a further aspect, the inspection assembly of the first aspect or any other aspect, wherein the shroud is configured to be attached to a first rail tie and a second rail tie and the base is configured to be attached to a third rail tie located between the first and second rail ties.

According to a further aspect, the inspection assembly of the first aspect or any other aspect, wherein: A) the base comprises a first base portion and a second base portion; B) the first base portion comprises a first bottom and one or more first sidewalls; C) the second base portion comprises a second bottom and one or more second sidewalls; D) a second sidewall of the one or more second sidewalls nearest the one or more first sidewalls is spaced apart from the one or more first sidewalls such that a gap is formed between the first base portion and the second base portion.

According to a further aspect, the inspection assembly of the first aspect or any other aspect, wherein the gap is sized to at least partially receive a rail tie.

According to a further aspect, the inspection assembly of the first aspect or any other aspect, wherein the first camera is positioned in the first base portion and the second camera is positioned in the second base portion.

According to a further aspect, the inspection assembly of the first aspect or any other aspect, wherein the first bottom and the second bottom are suspended above the ground when the inspection assembly is attached to rail ties.

According to a further aspect, the inspection assembly of the first aspect or any other aspect, wherein: A) the first camera and two or more first lights of the one or more lights form a first imaging array; and B) the second camera and two or more second lights of the one or more lights form a second imaging array.

According to a further aspect, the inspection assembly of the first aspect or any other aspect, wherein at least one of the first imaging array or the second imaging array is a linear array.

According to a further aspect, the inspection assembly of the first aspect or any other aspect, wherein the housing is configured to attach to one or more rail ties at a position that is outside the rails of a railway.

According to a further aspect, the inspection assembly of the first aspect or any other aspect, wherein the first camera and the second camera are configured to capture images from respective viewpoints that are respective heights that are 3 inches or less, with respect to a top surface of a rail tie to which the inspection assembly is mounted.

According to a further aspect, the inspection assembly of the first aspect or any other aspect, wherein the first camera, the second camera, and the one or more lights are in communication with one or more computing devices configured to determine a capture timing for capturing images of a target component of a moving object as the target component passes through the target region.

According to a further aspect, the inspection assembly of the first aspect or any other aspect, further comprising a first dampening device disposed between the first camera and the housing and a second dampening device disposed between the second camera and the housing.

According to a further aspect, the inspection assembly of the first aspect or any other aspect, wherein: A) the first dampening device and the second dampening device each comprises: B) a first mounting plate configured to attach to the housing; C) a second mounting plate configured to attach to the first camera or the second camera, respectively; and D) one or more dampening structures located between the first mounting plate and the second mounting plate.

According to a further aspect, the inspection assembly of the first aspect or any other aspect, wherein the one or more dampening structures comprises one or more springs.

According to a further aspect, an inspection system, comprising: A) a plurality of inspection assemblies, each of the plurality of inspection assemblies comprising: 1) a first camera angled at least partially in a vertical direction and at least partially in a horizontal direction to thereby be configured to capture images of a target region in a three-dimensional space from a first viewpoint; 2) a second camera positioned apart from the first camera, angled at least partially in the vertical direction and at least partially in the horizontal direction, and directed to the target region from a second viewpoint that is different from the first viewpoint; 3) one or more lights; and 4) a housing comprising a base and a shroud, the housing configured to attach to one or more rail ties and to at least partially envelop the first camera and the second camera, wherein: i) each of the plurality of inspection assemblies is mounted to one or more rail ties at a corresponding location that is outside the rails of a railway; ii) a first inspection assembly of the plurality of inspection assemblies is located on a first side of the rails at a first longitudinal location along the railway; and iii) a second inspection assembly of the plurality of inspection assemblies is located on a second side of the rails at a second longitudinal location along the railway, the second side being opposite the first side.

According to a further aspect, the inspection system of the second aspect or any other aspect, wherein the second longitudinal location is the same as the first longitudinal location.

According to a further aspect, the inspection system of the second aspect or any other aspect, wherein the second longitudinal location is different from the first longitudinal location.

According to a further aspect, the inspection system of the second aspect or any other aspect, further comprising: A) one or more wheel detection sensors configured to detect a presence or a non-presence of a railcar wheel at a location along the railway that is upstream from the plurality of inspection assemblies; and B) one or more computing devices in electrical communication with: 1) the one or more wheel detection sensors; and 2) inspection cameras comprising the first and second cameras of each of the plurality of inspection assemblies, wherein the one or more computing devices is configured to determine a capture timing for each of the inspection cameras based at least in part on a train speed estimation determined according to wheel detection events detected by the wheel detection sensors.

According to a further aspect, the inspection system of the second aspect or any other aspect, wherein the one or more computing devices is further configured to determine the capture timing for each of the inspection cameras based on at least (i) a physical distance between the wheel detection sensors and each corresponding one of the inspection cameras and (ii) one or more electrical signal transmission or processing latencies.

These and other aspects, features, and benefits of the claimed innovation(s) will become apparent from the following detailed written description of the preferred examples and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more examples and/or aspects of the disclosure and, together with the written description, serve to explain the principles of the disclosure. Wherever possible, the same reference numbers are used throughout the drawings to refer to the same or like elements of the disclosed systems and processes, and wherein:

FIG. 1G illustrates a right-side view of an example rail-side inspection assembly, in accordance with the disclosed technology;

FIG. 1H illustrates a left-side view of an example rail-side inspection assembly, in accordance with the disclosed technology;

DETAILED DESCRIPTION

Figure 1A:
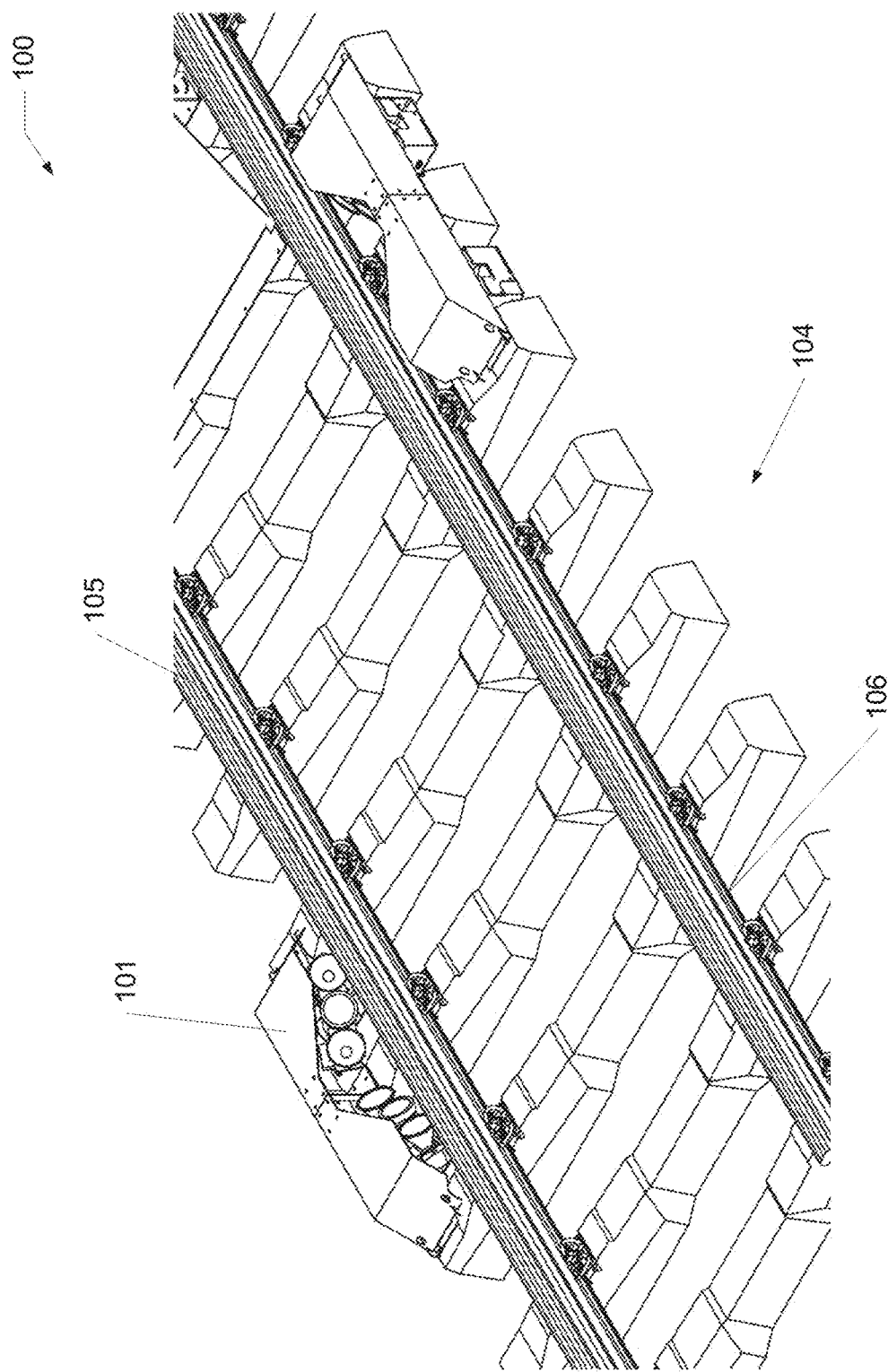
FIG. 1A illustrates a perspective view of an example installed rail-side inspection assembly, in accordance with the disclosed technology.

The disclosed technology relates generally to systems and methods for inspecting moving vehicles and, more specifically, to various components and systems for capturing images and/or gathering data of or relating to regions of moving rail-bound vehicles (e.g., railcars). Some examples of the disclosed technology will be described more fully with reference to the accompanying drawings and/or with respect to inspecting passing railcars. However, the disclosed technology can be embodied in many different forms and should not be construed as limited to the implementations set forth herein. For example, the disclosed technology can be configured to inspect moving objects (e.g., vehicles) other than railcars or other rail-bound vehicles. For example, the disclosed technology can be installed on a road to inspect and/or monitor cars or other vehicles (e.g., road vehicles). Alternatively or in addition, the disclosed technology can be installed at, near, or on a weight station to inspect and/or monitor trucks, trailers, or other shipping vehicles. Alternatively or in addition, the disclosed technology can be installed in or near a boat canal, a dock, and/or a body of water to inspect and/or monitor boats. Alternatively or in addition, the disclosed technology can be installed on or near the tarmac of an airport, an aircraft hangar, and/or an airplane gate to analyze planes, flying drones, or other aircraft.

The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range of formats (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to and are not intended to imply that the objects so described should be in a given sequence, either temporally, spatially, in ranking, or in any other manner.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the illustrative examples provided in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Example Embodiments

Referring now to the figures, for the purposes of example and explanation of the fundamental processes and components of the disclosed apparatuses, systems, and methods, reference is made to FIG. 1, which illustrates an example inspection system 100. As will be understood and appreciated, the inspection system 100 shown in FIG. 1 represents merely one approach or example of the disclosed technology, and other aspects are used according to various examples of the disclosed technology.

The disclosed technology includes one or more rail-side inspection assemblies 101, which can capture images of one or more components of a moving object, such as a passing railcar. For example, the rail-side inspection assembly 101 can be configured to capture images of a target assembly, target sub-assembly, and/or target component (referenced herein as "target component" for clarity and/or brevity). The rail-side inspection assembly 101 can be configured to capture images of the target component when the target component passes the rail-side inspection assembly 101, and as such, the rail-side inspection assembly 101 can be configured to capture images from a target region, which can refer to a specific three-dimensional point, space, area, and/or region, such that the rail-side inspection assembly 101 can capture images of the target component as is passes the rail-side inspection assembly 101. For example, the rail-side inspection assembly 101 can be configured to capture images of a railcar's cross-key component, which can be located on the railcar's coupler. The rail-side inspection assembly 101 can include one or more cameras, example sensors, and/or example lights aimed at the target region, which can correspond to a lower region or portion of a given passing railcar. The various cameras, sensors, and/or lights of the rail-side inspection assembly 101 can be used to capture images and/or gather data on the target component (e.g., cross-key component of the railcar coupler).

For example, the rail-side inspection assembly 101 can capture images of the cross-key component of the railcar and/or other target components of a railcar. Continuing this example, a computing system in communication with the rail-side inspection assembly 101 can be configured to process the images generated by the rail-side inspection assembly 101 to detect any defects associated with the cross-key component or the target component.

The inspection system 100 can include two or more rail-side inspection assemblies 101, which can be positioned to capture images and/or other data on both sides of a passing railcar, as a non-limiting example. For, example, a first rail-side inspection assembly can be positioned on a first side of a train track 104, and a second rail-side inspection assembly can be positioned on a second side of the train track 104. Alternatively or in addition, two or more assemblies can be positioned on the same side of the tracks. One or more of the rail-side inspection assemblies 101 can be positioned adjacent to one or more rails 105, 106 of the train track 104 (e.g., at or near the end of the rail ties). For example, the first rail-side inspection assembly can be located outside the rails on a first side of the train track 104, and the second rail-side inspection assembly can be located outside the rails on a second side of the train track 104. The term "outside" can refer to the region that is not between both the first rail 105 and the second rail 106. Alternatively or in addition, one or more rail-side inspection assembly 101 can be located between the rails 105, 106. As discussed in more detail herein, the rail-side inspection assembly 101 can be attached to (and/or attachable to) one or more rail ties of the train track 104. Alternatively or in addition, the rail-side inspection assembly 101 can be attached to (and/or attachable to) other locations, such as the ground, the ballast, another structure located proximate train tracks 104, as non-limiting examples. The rail-side inspection assembly 101 can be attached to (or attachable to) a top side of one or more rail ties. Alternatively or in addition, the rail-side inspection assembly 101 can be attached to (or attachable to) the side of one or more rail ties (e.g., such that some or all of the rail-side inspection assembly 101 is located between adjacent rail ties).

The rail-side inspection assembly 101 can include one or more cameras and/or one or more lights. As a non-limiting example, the rail-side inspection assembly 101 can include one or more arrays, and the arrays can each include one or more cameras and one or more lights. For example, a given array can be a linear array and can include a single camera bookended by a pair of lights, as a non-limiting example.

The cameras of the rail-side inspection assembly 101 can be or include line-scan cameras, area-scan cameras, and/or any other cameras capable of capturing images of target components of passing railcars. For example, the cameras and lights of the rail-side inspection assembly 101 can include particular machine vision cameras with high sensitivity. Alternatively or in addition, the cameras and lights of the rail-side inspection assembly 101 can capture clear images of railcars moving at high speeds. The cameras and lights of the rail-side inspection assembly 101 can include one or more cameras and one or more lights. For example, the rail-side inspection assembly 101 can include a camera positioned in between two lights. The lights can illuminate the location of the cross-key component such that the camera can gather images of the cross-key component with less than 2 mm of blur. The rail-side inspection assembly 101 can gather images and other data from railcars moving at speeds of up to 70 mph.

Figure 1B:
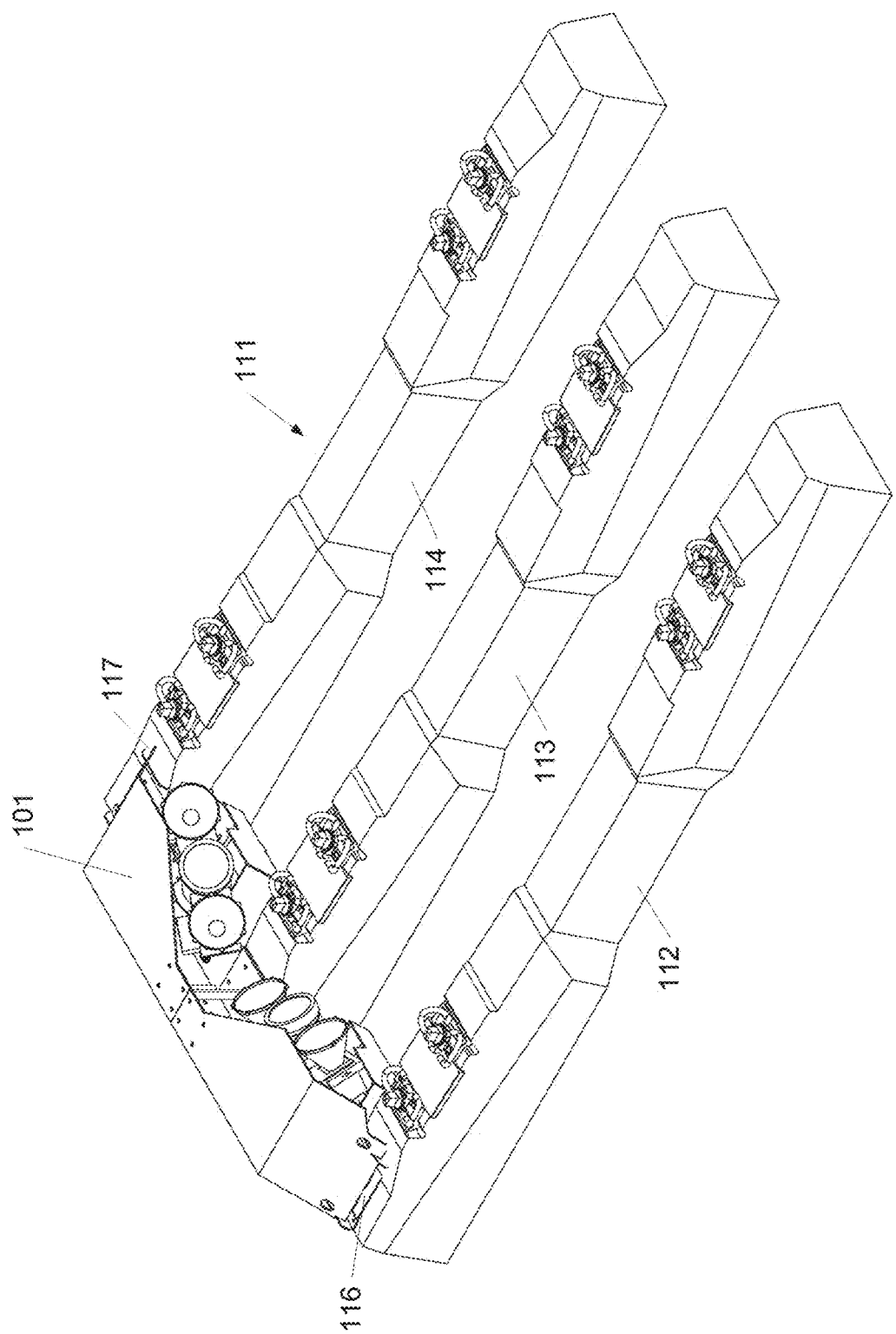
FIG. 1B illustrates a perspective view of an example installed rail-side inspection assembly, in accordance with the disclosed technology.

Referring now to FIG. 1B, illustrated is a perspective view of an example rail-side inspection assembly 101, in accordance with the disclosed technology. As disclosed herein, the rail-side inspection assembly 101 can be attached to rail ties 111. The rail-side inspection assembly 101 can be fixed to the rail ties 111 via one or more fasteners (e.g., screws, bolts, lag bolts, ties), one or more welding joints or other welds, and/or any other fixing mechanism capable of securing the rail-side inspection assembly 101 to the train tracks 104. For example and as illustrated, the rail-side inspection assembly 101 can be fixed to three adjacent rail ties 111. Continuing this example, the rail-side inspection assembly 101 can straddle a second rail tie 113, where a first end 116 of the rail-side inspection assembly 101 can attach to a first rail tie 112 and a second end 117 of the rail-side inspection assembly 101 can attach to a third rail tie 114.

The rail-side inspection assembly 101 can be configured to mount directly onto existing rail ties 111. For example, the rail-side inspection assembly 101 can include one or more mounting holes to account for variations in the train track 104 geometry and the spacings between the rail ties 111.

Figure 1C:
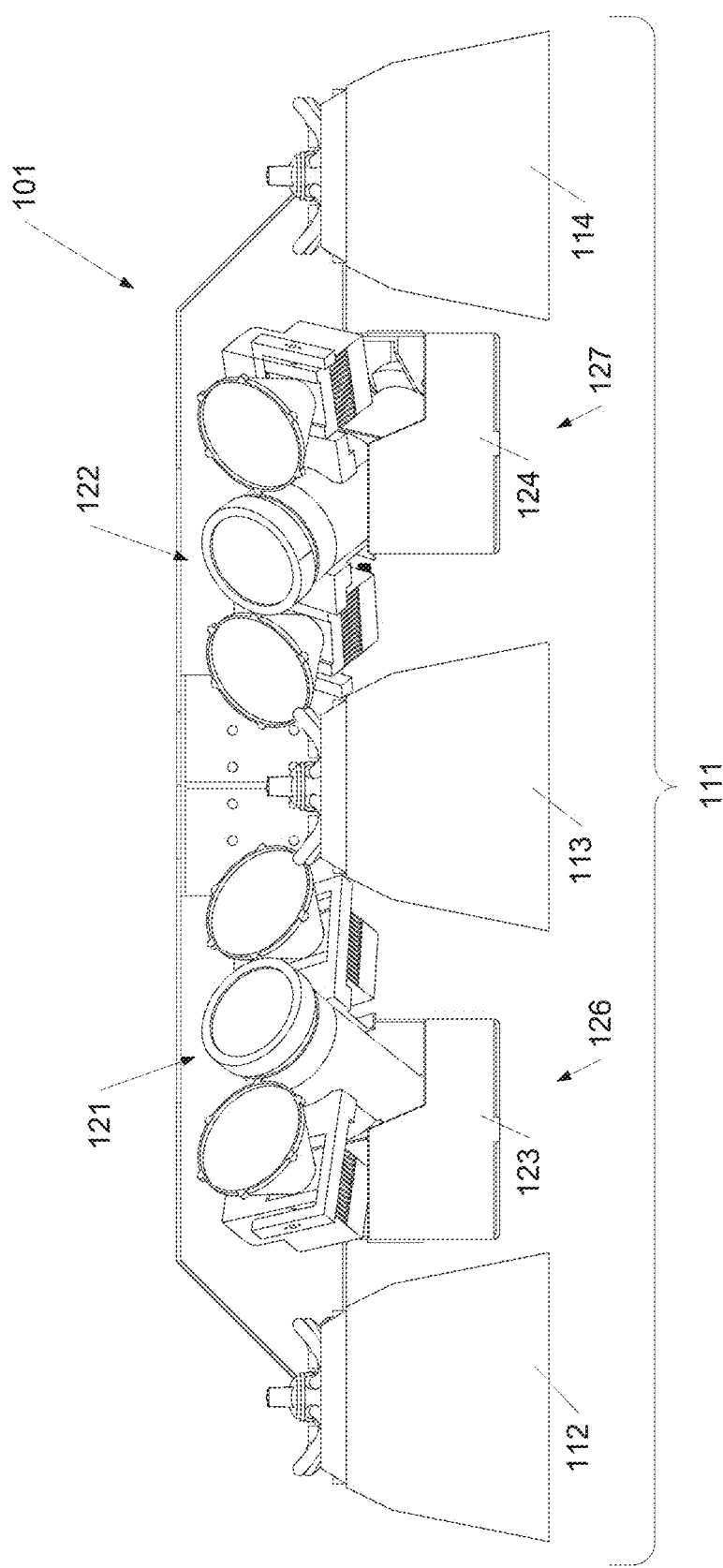
FIG. 1C illustrates a front-side view of an example installed rail-side inspection assembly, in accordance with the disclosed technology.

Referring now to FIG. 1C, illustrated is an example front-side view of the installed rail-side inspection assembly 101, in accordance with the disclosed technology. As illustrated, the rail-side inspection assembly 101 can include a first camera and light array 121 and a second camera and light array 122. However, the disclosed technology is not so limited and can include one, three, four, or more camera and light arrays. Alternatively or in addition, the rail-side inspection assembly 101 can include one or more cameras and/or one or more lights arranged in other (e.g., non-linear, non-array) configurations. For example, the rail-side inspection assembly 101 can include a camera positioned between a group of three, four, or more lights (e.g., arranged around or about the camera, such as in an equidistantly disposed arrangement).

Turning back to the rail-side inspection assembly illustrated in FIG. 1C, the rail-side inspection assembly 101 can include a base. The base can include a first base portion 123 configured to support the first camera and light array 121 and a second base portion 124 configured to support the second camera and light array 122. The first base portion 123 can extend through a first gap 126 between the first rail tie 112 and the second rail tie 113. The second base portion 123 can extend through a second gap 127 between the second rail tie 113 and the third rail tie 114. The first camera and light array 121 and the second camera and light array 122 can straddle the second rail tie 113. The rail-side inspection assembly 101 can attach to the first rail tie 112, the second rail tie 113, and/or the third rail tie 114 via one or more screws, bolts, and/or any other fixing mechanism.

Figure 1D:
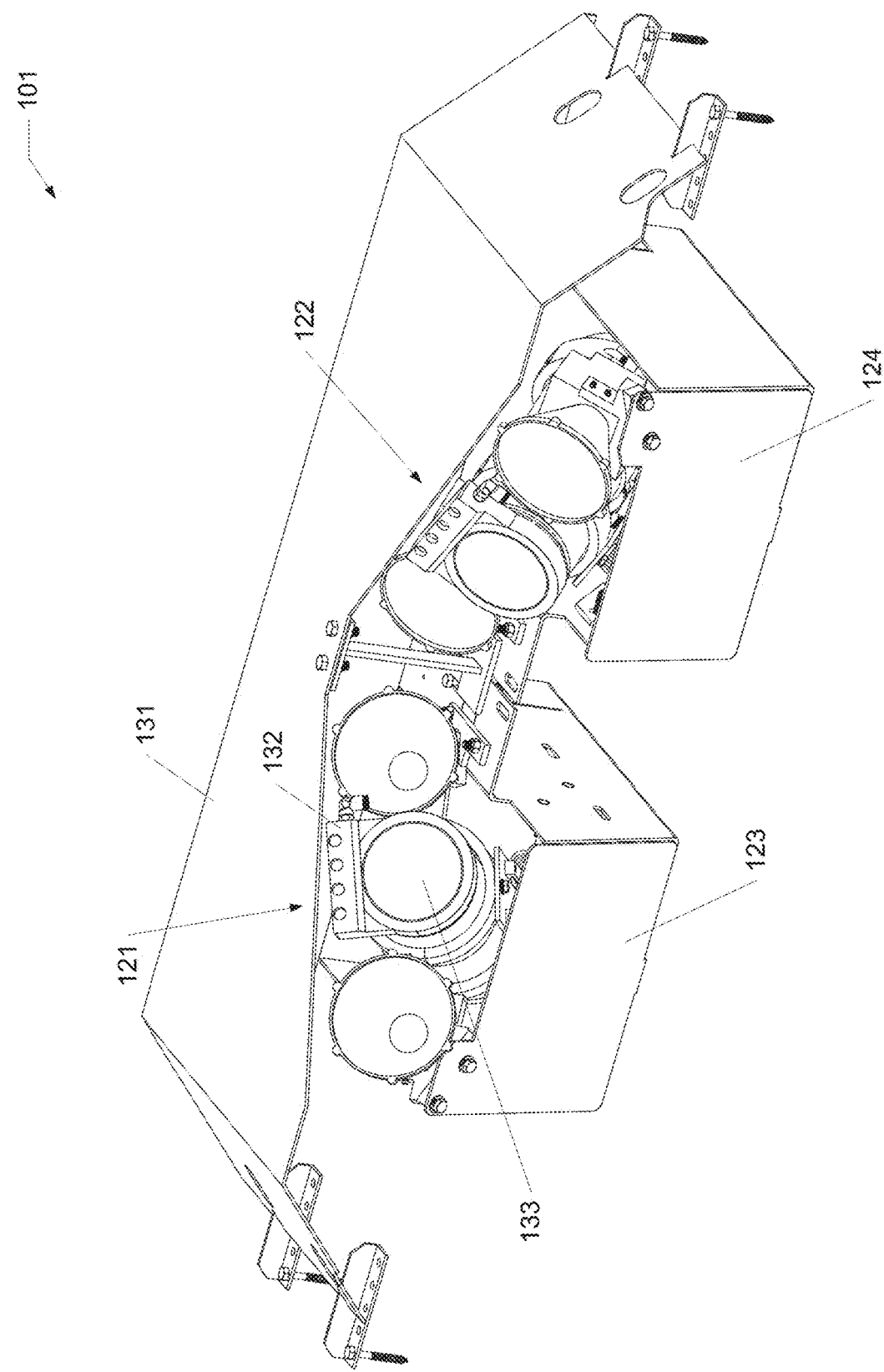
FIG. 1D illustrates a perspective view of an example rail-side inspection assembly, in accordance with the disclosed technology.

Referring now to FIG. 1D, illustrated is another perspective view of the rail-side inspection assembly 101, in accordance with the disclosed technology. The rail-side inspection assembly 101 can include one or more air curtains 132. A given air curtain 132 can be installed on, near, and/or adjacent to one or more cameras. For example, a first air curtain 132 can be installed at or on the camera of the first camera and light array 121, and a second air curtain 132 can be installed at or on the camera of the second camera and light array 122. The air curtain 132 can be in fluid communication with a compressed air source to provide compressed air at the camera(s) that flows over the lenses of the camera 133. The air curtains 132 can clean the lenses of the cameras 133 during use from debris.

The rail side inspection assembly 101 can include a first camera and light array 121 and a second camera and light array 122. The first camera and light array 121 and the second camera and light array 122 can each be angled to a corresponding target region (e.g., a point or region in a three-dimensional space). Alternatively or in addition, the first camera and light array 121 and the second camera and light array 122 can be directed to a single, common target region, such that images of the target region (e.g., of a target component when it is located in the target region) can be captured. For example, the first camera and light array 121 can be angled at least partially in a vertical direction and at least partially in a horizontal direction to point at the expected location of the cross-key component or other component of a railcar. Continuing this example, the second camera and light array 122 can be partially angled in an at least partially vertical direction and an at least partially horizontal direction to point at the expected location of the cross-key component or other component of a railcar. The first camera and light array 121 and the second camera and light array 122 can be differently and/or oppositely angled such that the camera and light arrays point to the same location but from different angles and/or viewpoints. Accordingly, the rail-side inspection assembly can be configured to contemporaneously and/or simultaneously capture images of a single target region (e.g., point and/or region) and/or a single target component from different angles, which can be useful in detecting defects associated with the target component, as a non-limiting example.

The camera and light arrays 121, 122 can include the cameras 133 and the lights 151. The cameras 133 can include specialized machine vision cameras with high sensitivity to generate images of the cross-key component of the passing railcar. For example, the cameras 133 can include high-speed, high resolution, and a highly sensitive sensor. The lights 151 can include any particular light that is capable of illuminating the three-dimensional space in which the cross-key component is present. For example, the lights 151 can include 150 W lights capable of illuminating the area in which the cross-key component is present.

The camera and light arrays 121, 122 can include similar configurations. For example, the camera and light arrays 121, 122 can each include one camera 133 and two lights 151. The camera 133 can be positioned between the two lights 151. The two lights can equally illuminate an area such that the camera 133 can generate a low blur and high-quality image of the cross-key component.

The rail-side inspection assembly 101 can include a shroud 131, the first base portion 123, and the second base portion 124. The first base portion 123 and the second base portion 123 can support the first camera and light array 121 and the second camera and light array 122, respectively. The first base portion 123 and the second base portion 123 can protect the first camera and light array 121 and the second camera light array 122 from debris as a railcar passes the rail-side inspection assembly 101. Alternatively or in addition, the shroud 131 can protect the first camera and light array 121 and the second camera and light array 122 from debris as a railcar passes the rail-side inspection assembly 101.

The first base portion 123 and the second base portion 124 can rest on a ballast (e.g., the ground) between the rail ties 111. For example, the first base portion 123 and the second base portion 124 can have a height less than the rail ties 111 such that the first base portion 123 and the second base portion 124 are suspended off the ballast. The first camera and light array 121 and the second camera and light array 122 can be configured to partially extend into the ballast and capture images from a viewpoint that is approximately at least 1 inch above the rail ties 111, 1 to 6 inches above the rail ties 111, or less than 6 inches above the rail ties 111, as non-limiting examples.

Figure 1E:
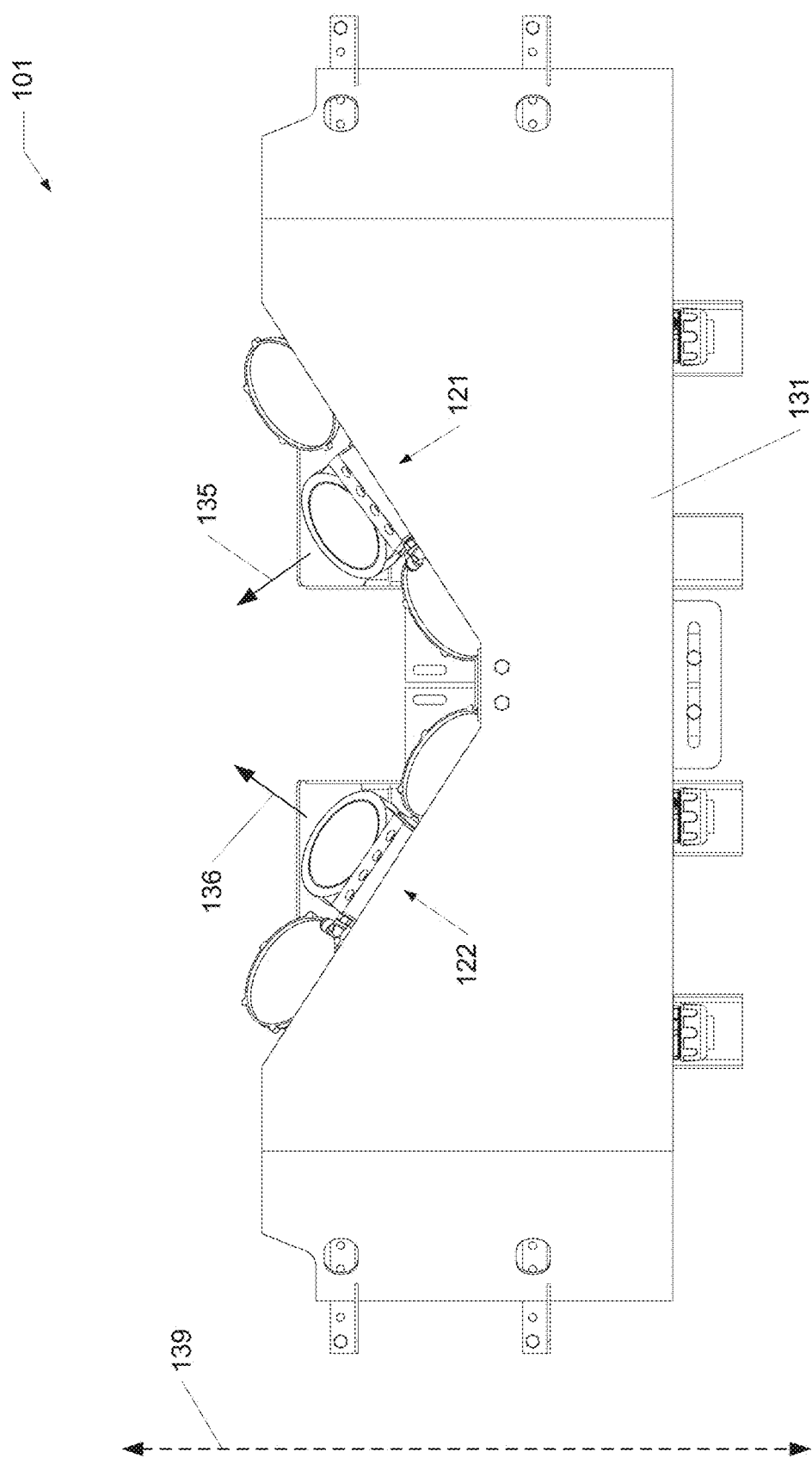
FIG. 1E illustrates a top view of an example rail-side inspection assembly, in accordance with the disclosed technology.

Referring now to FIG. 1E, illustrated is an example top view of the rail-side inspection assembly 101, in accordance with the disclosed technology. The first camera and light array 121 and the second camera and light array 122 can point in a first direction 135 and a second direction 136, respectively. The first direction 135 and the second direction 136 can indicate the angle at which the first camera and light array 121 and the second camera and light array 122 are positioned relative to a first axis 139. The angle between the first direction 135 and the second direction 136 can be approximately 40 degrees, approximately 45 degrees, approximately 50 degrees, in a range between approximately 40 degrees and approximately 50 degrees, in a range between approximately 40 degrees and approximately 60 degrees, in a range between approximately 30 degrees and approximately 50 degrees, and/or in a range between approximately 30 degrees and approximately 60 degrees, as non-limiting examples. The angles between the first direction 135 and the first axis 139 and between the second direction 136 and the first axis 139, respectively, can be the same. Alternatively, the angles between the first direction 135 and the first axis 139 and between the second direction 136 and the first axis 139 can be different. For example, the angle between the first direction 135 and the first axis 139 can be in a range between approximately 0 degrees and approximately 60 degrees, in a range between approximately 15 degrees and approximately 45 degrees, or in a range between approximately 30 degrees and 50 degrees, as non-limiting examples, and the angle between the second direction 136 and the and the first axis 139 can be (i) different the angle between the first direction 135 and the first axis 139 and (ii) in a range between approximately 0 degrees and approximately 60 degrees, in a range between approximately 15 degrees and approximately 45 degrees, or in a range between approximately 30 degrees and 50 degrees, as non-limiting examples.

The shroud 131 can partially expose the first camera and light array 121 and the second camera and light array 122. The shroud 131 can protect the first camera and light array 121 and the second camera and light array 122 while allowing the first camera and light array 121 and the second camera and light array 122 to gather data on the cross-key component of the passing railcar. The shroud 131 can be constructed out of hardened steel, stainless steel, aluminum, and/or any other material capable of protecting the components of the rail-side inspection assembly 101.

Figure 1F:
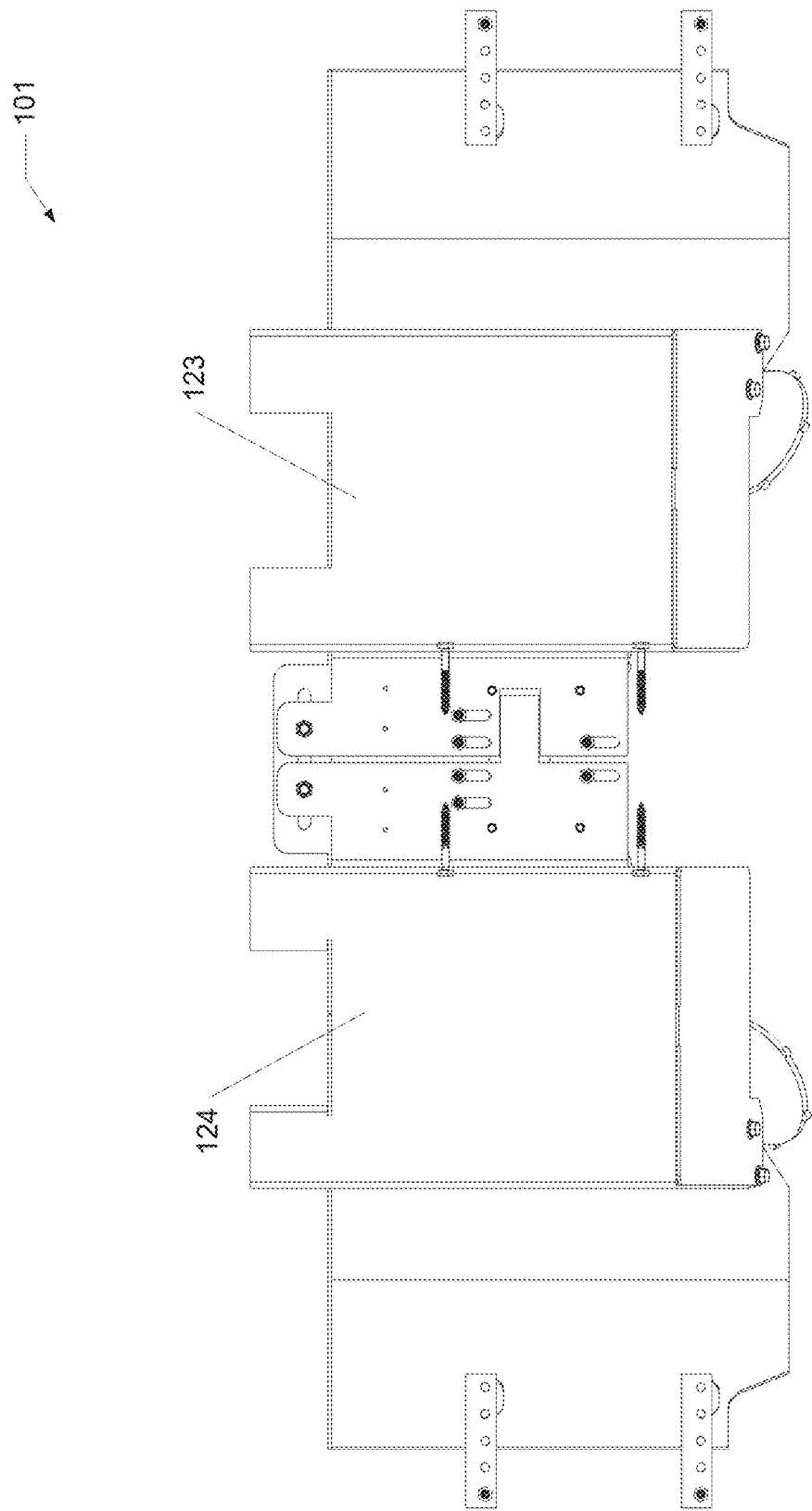
FIG. 1F illustrates a bottom view of an example rail-side inspection assembly, in accordance with the disclosed technology.

Referring now to FIG. 1F, illustrated is an example bottom view of the rail-side inspection assembly 101, in accordance with the disclosed technology. The rail-side inspection assembly 101 can include the first base portion 123 and the second base portion 123. The first base portion 123 and the second base portion 123 can protect the bottom portion of the first camera and light assembly 121 and the second camera and light assembly 122. For example, as the railcar passes the rail-side inspection assembly 101, the first base portion 123 and the second base portion 123 can protect the first camera and light array 121 and the second camera and light array 122. The first base portion 123 and the second base portion 123 can be constructed out of hardened steel, stainless steel, aluminum, and/or any other material capable of protecting the components of the rail-side inspection assembly 101.

Referring now to FIG. 1G, illustrated is an example left-side view of the rail-side inspection assembly 101, in accordance with the disclosed technology. The rail-side inspection assembly 101 can include one or more screws 142 at the first end 116 of the rail-side inspection assembly 101. The one or more screws 142 can fix the rail-side inspection assembly 101 to the one or more rail ties 111.

The rail-side inspection assembly 101 can include a third direction 137. The third direction 137 can indicate the direction in which the first camera and light array 121 and the second camera and light array 122 are pointed. The third direction 137 can be angled relative to the second axis 141. The angle between the third direction 137 and the second axis 141 can be in a range between approximately 15 degrees and approximately 60 degrees, between approximately 20 degrees and approximately 30 degrees, between approximately 30 degrees and approximately 40 degrees, and/or between approximately 50 degrees and approximately 60 degrees, as non-limiting examples.

Referring now to FIG. 1H, illustrated is a right-side view of the rail-side inspection assembly 101, in accordance with the disclosed technology. The rail-side inspection assembly 101 can include one or more screws 142 at the second end 117 of the rail-side inspection assembly 101. The one or more screws 142 can fix the rail-side inspection assembly 101 to the one or more rail ties 111. For example, the one or more screws 142 can fix the rail-side inspection assembly 101 to the third rail tie 114.

Figure 1I:
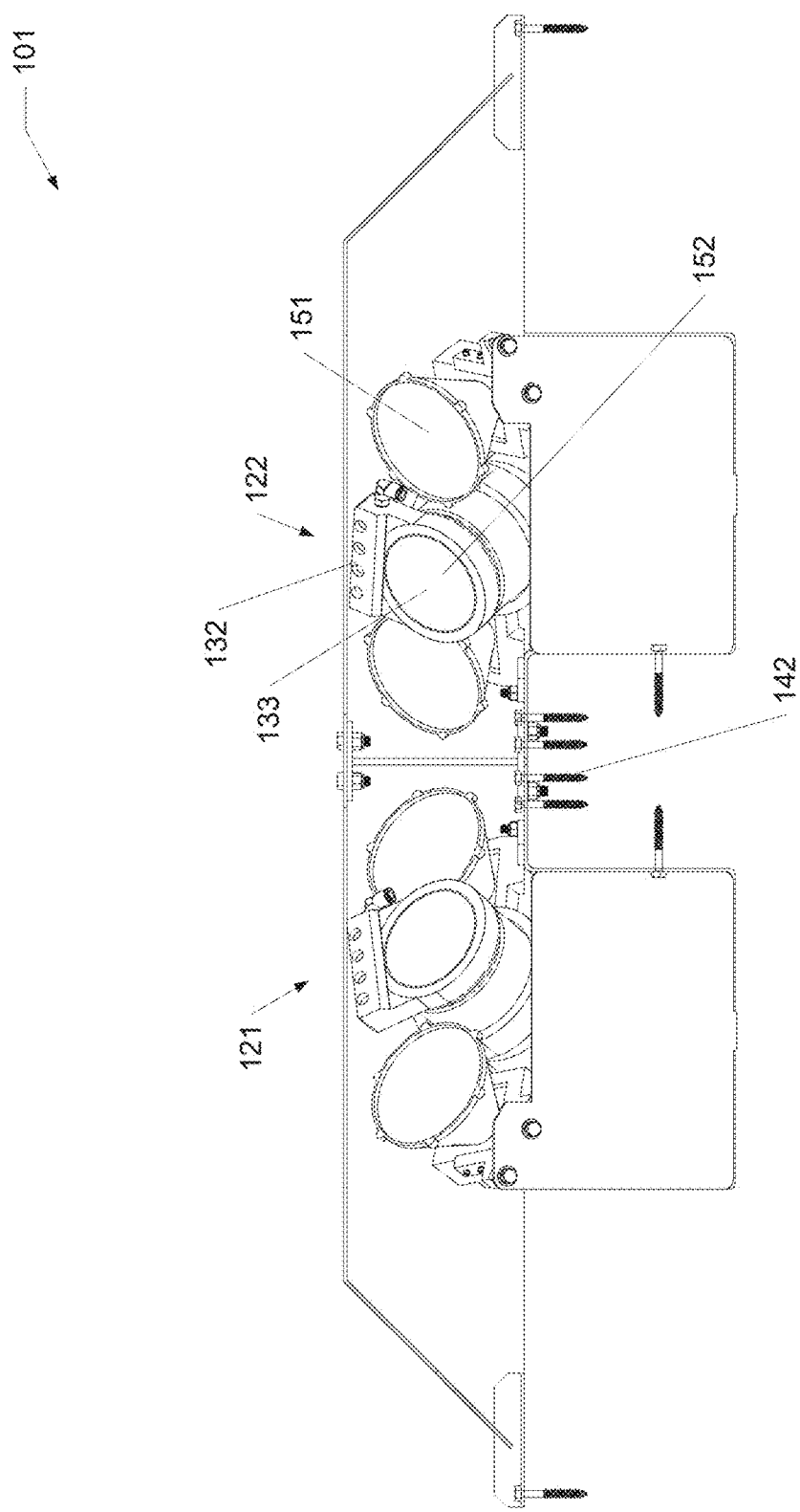
FIG. 1I illustrates a front-side view of an example rail-side inspection assembly, in accordance with the disclosed technology.

Referring now to FIG. 1I, illustrated is an example front side view of the rail-side inspection assembly 101, in accordance with the disclosed technology. The camera and light arrays 121, 122 of the rail-side inspection assembly 101 can include the one or more cameras 133 and one or more lights 121. The one or more cameras 133 can each include the air curtain 132. The air curtain 132 can connect to a compressed air source. The compressed air source can feed the air curtain 132 with air. The air curtain 132 can employ the air to generate an air curtain over a lens 152 of the camera 133. The air curtain can blow air over the lens 152 such that any debris that accumulates on the lens 152 is blown off and removed from the lens 152. The air curtain 132 can generate air used to cool the components of the rail-side inspection assembly 101.

The rail-side inspection assembly 101 can include one or more screws 142. The one or more screws 142 can fix the rail-side inspection assembly 101 to the one or more rail ties 111. For example, the screws 142 can attach to the second rail tie 113. Though illustrated as screws, any particular similar fixing mechanism can be used to secure the rail-side inspection assembly 101 to the rail ties 111 (e.g., bolts, welding points, ties, etc.).

Figure 1J:
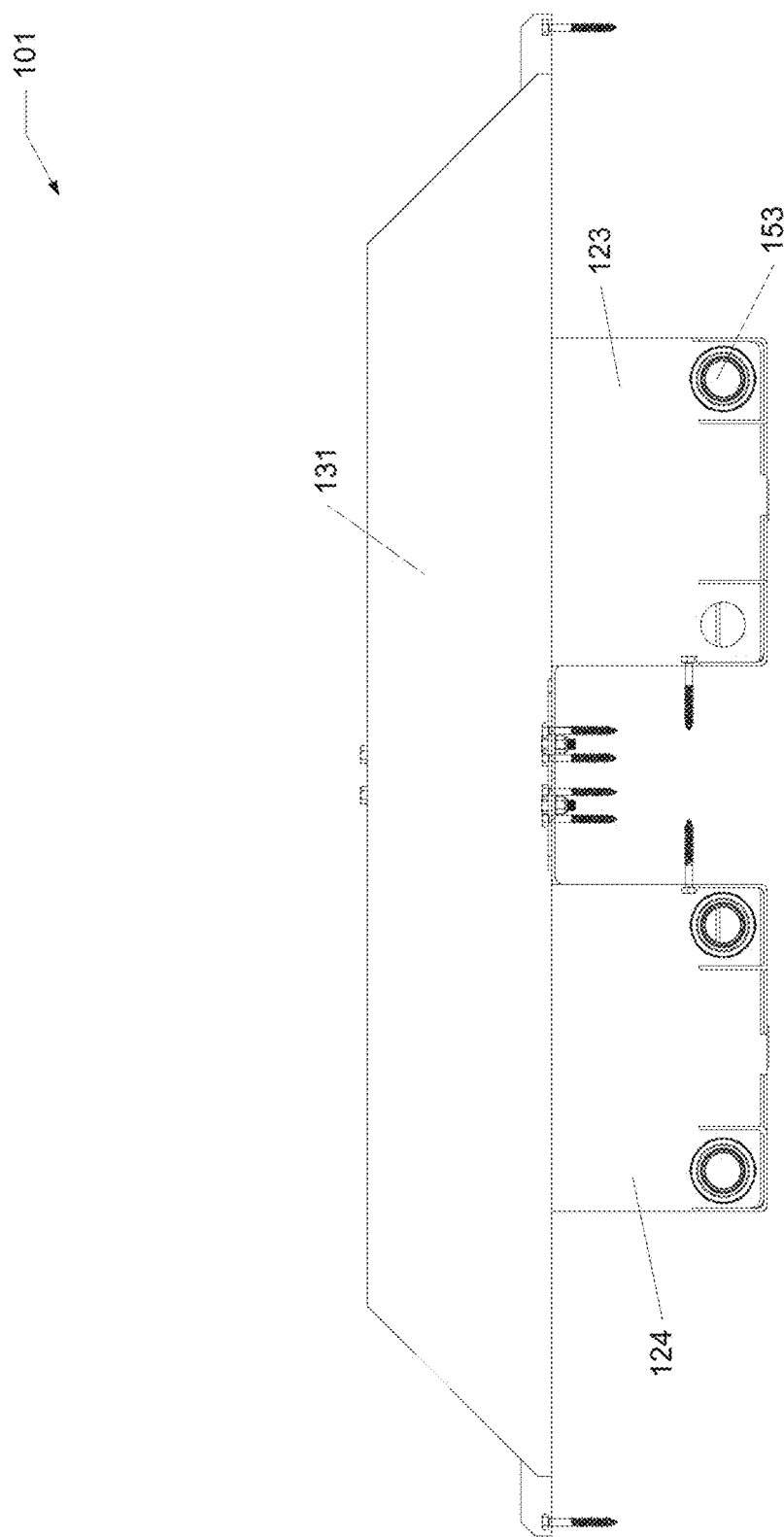
FIG. 1J illustrates a back-side view of an example rail-side inspection assembly, in accordance with the disclosed technology.

Referring now to FIG. 1J, illustrated is a backside view of the rail-side inspection assembly 101, in accordance with the disclosed technology. The shroud 131 of the rail-side inspection assembly 101 can extend around the camera and light arrays 121, 122. The shroud 131 can protect the rear of the camera and light arrays 121, 122 such that the camera and light arrays 121, 122 are not damaged by debris during use. The rail-side inspection assembly 101 can include one or more conduit adapters such that various wires and/or compressed air cables can run through the rail-side inspection assembly 101. The rail-side inspection assembly 101 can include one or more conduit adapter 153. The conduit adapter 153 can allow one or more wires and/or one or more hoses to pass into the first base portion 123 and the second base portion 124 while maintaining a watertight configuration.

Figure 1K:
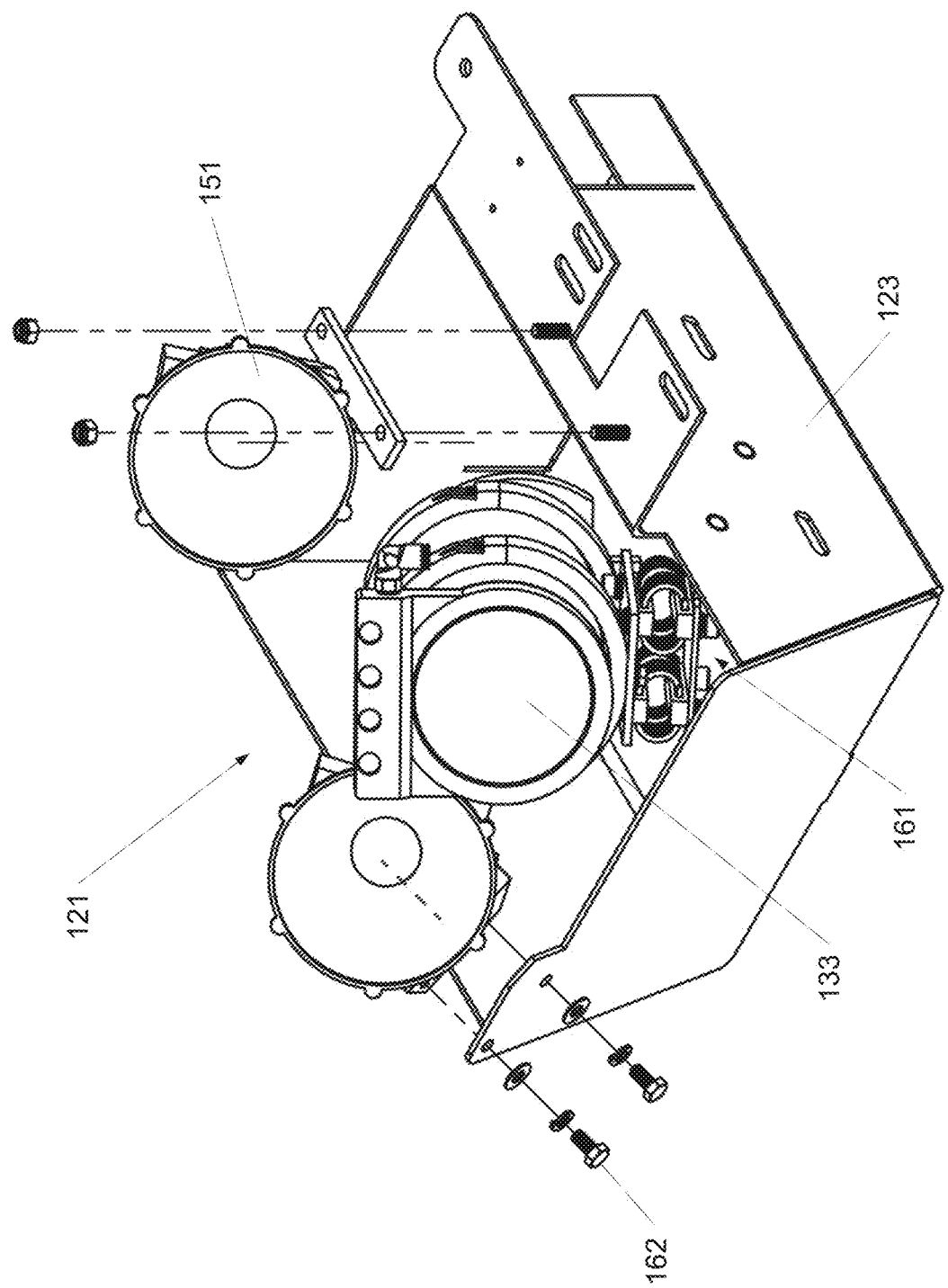
FIG. 1K illustrates a partial exploded perspective view of an example camera enclosure, in accordance with the disclosed technology.

Referring now to FIG. 1K, illustrated is an example partially exploded view of the first camera and light array 121 and the first base portion 123, in accordance with the disclosed technology. However, the various components and/or configurations discussed herein can apply to other aspects of the disclosed technology, such as the second camera and light array 122 and the first base portion 123, as a non-limiting example. The first camera and light array 121 can be attached to the first base portion 123. The lights 151 can be fixed to the first base portion 123. For example, the lights 151 can include one or more screws 162 that fix or attach the lights 151 to the first base portion 123. The camera 133 can be attached to the first base portion 123. Alternatively or in addition, and as discussed in further detail herein, first camera and light array 121 and or the camera 133 alone can be fixed or attached to the first base portion 123 via a dampening system 161. The dampening system 161 can reduce the mechanical vibrations exhibited by the camera 133 as a train passes the rail-side inspection assembly 101.

Figure 1L:
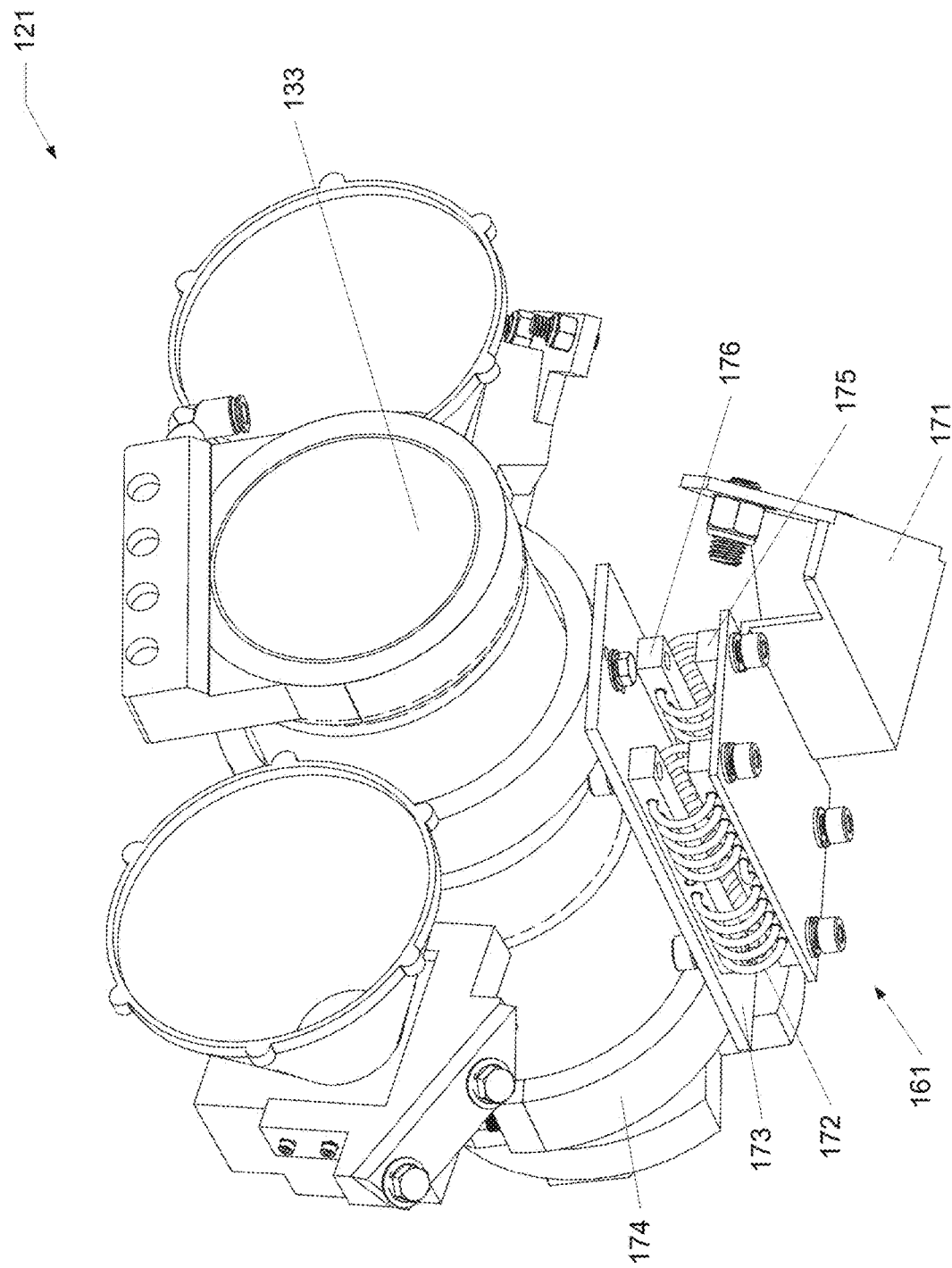
FIG. 1L illustrates a perspective view of an example camera and light array, in accordance with the disclosed technology.

Referring now to FIG. 1L, illustrated is an example perspective view of the first camera and light assembly 121, in accordance with the disclosed technology. The various components discussed herein can apply to both the first camera and light assembly 121 and the second camera and light assembly 122, though only the first camera and light assembly 121 is illustrated for the sake of brevity. The first camera and light assembly 121 can include the dampening system 161. The dampening system 161 can reduce the mechanical vibrations exerted on the camera 133 generated from a particular passing railcar. The dampening system 161 can include a lower plate 171, one or more springs 172 (or other dampening devices), an upper plate 173, and one or more ties 174 (e.g., mounting rings). The lower plate 171 can attach to the first base portion 123 (e.g., as shown in further details in FIG. 1M). The one or more springs 172 can extend through a first attachment point 175 of the lower plate 171. The one or more springs 172 can extend through a second attachment point 176 of the upper plate 173, operatively connecting the upper plate 173 to the lower plate 171. The upper plate 173 can attach to the camera 133 through one or more ties 174. By connecting through the one or more ties 174, the camera 133 can be fixed to the first base portion 123 through the upper plate 173, the one or more springs 172, and the lower plate 171. The one or more springs 172 can dampen for the camera 133 any mechanical vibrations generated by the passing railcar.

Figure 1M:
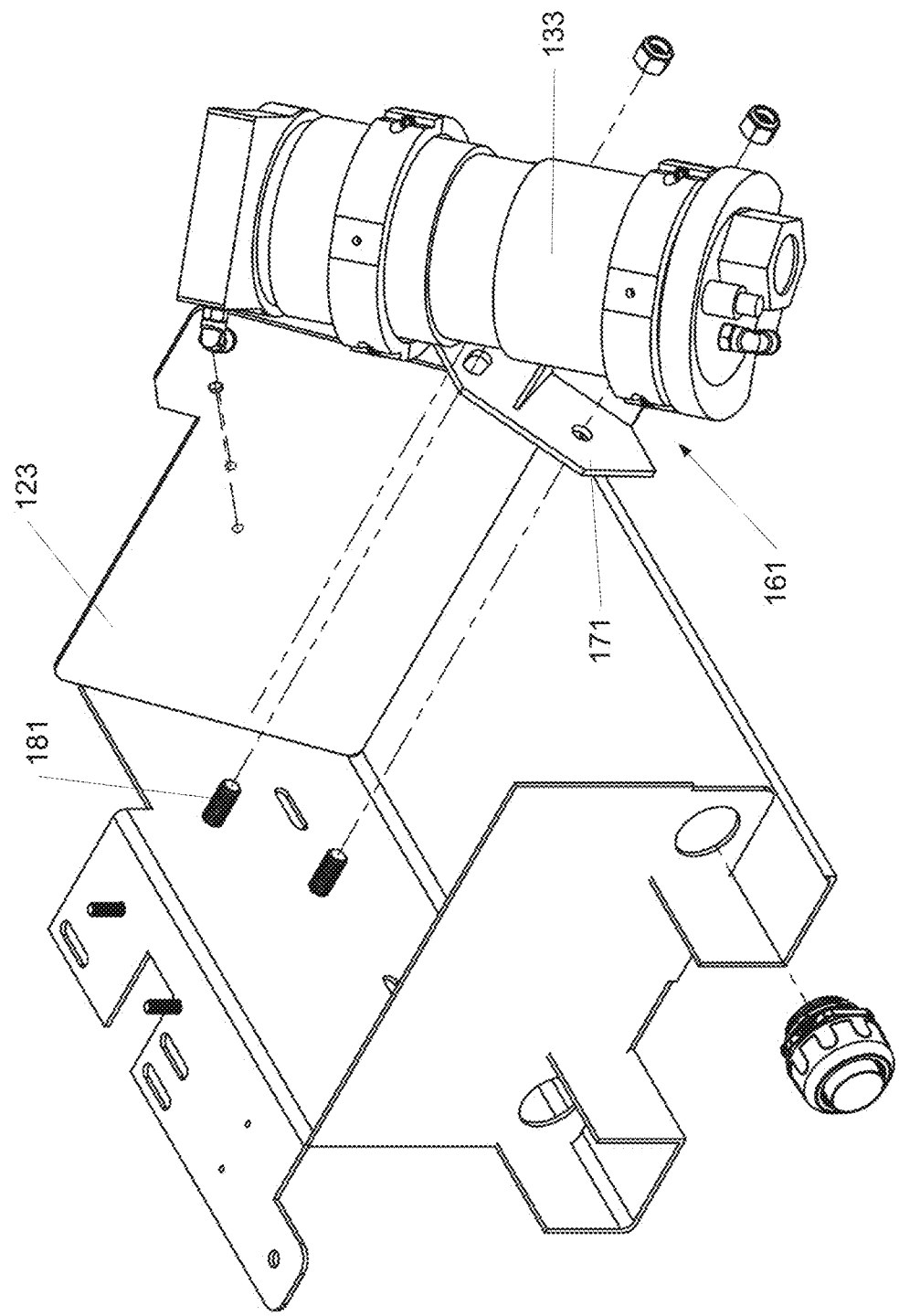
FIG. 1M illustrates a partial exploded perspective view of an example camera enclosure, in accordance with the disclosed technology.

Referring now to FIG. 1M, illustrated is an example partially exploded view of the first base portion 123, in accordance with the disclosed technology. The various components discussed herein can apply to both the first base portion 123 and the second base portion 123, though only the first base portion 123 is illustrated for the sake of brevity. The camera 133 can be attached to the first base portion 123 through the dampening system 161. The dampening system 161 can include the lower plate 171. The lower plate 171 can attach to the first base portion 123 through the one or more screws 181. The lower plate 171 can fix the camera 133 to the first base portion 123.

Figure 2:
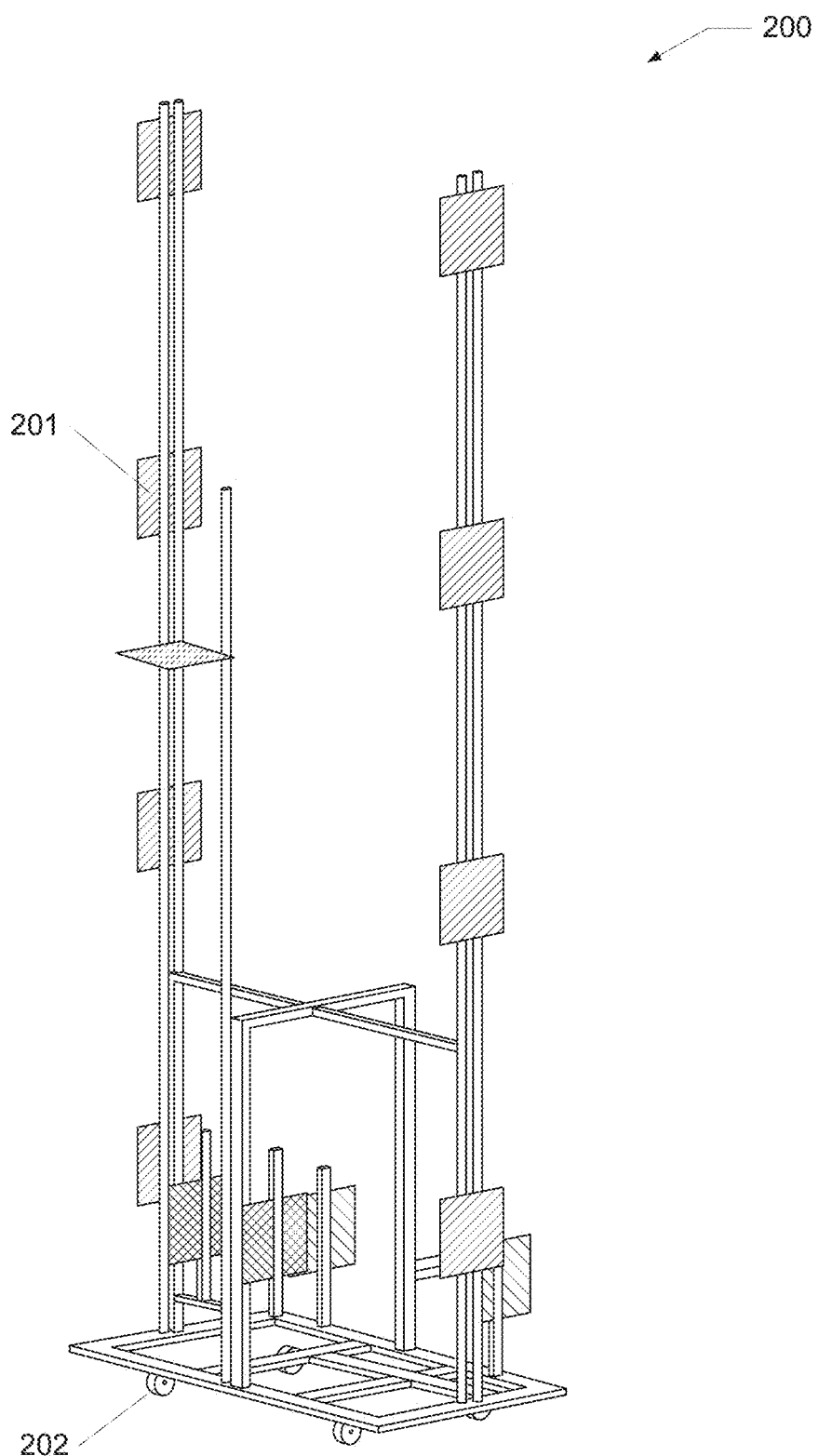
FIG. 2 illustrates a perspective view of an example portal focus cart, in accordance with the disclosed technology.

Referring now to FIG. 2, illustrated is a perspective view of a portal focus cart 200, in accordance with the disclosed technology. The cameras 133 of the rail-side inspection assembly 101 can focus on the components or regions of interest of the passing railcar. For example, during installation of the rail-side inspection assembly 101 (and/or periodically following the initial installation), the rail-side inspection assembly 101 can use the portal focus cart 200 to calibrate one or more sensors and/or cameras 133 of the rail-side inspection assembly 101. Such an apparatus can have various targets 201 placed at various locations within the portal focus cart 200 such that focusing cameras on those regions can produce the desired results when the passing railcar 103 travels past the rail-side inspection assembly 101. Such targets 201 can have fiducial markers such that their location and orientation may be automatically detected by image processing algorithms of the computing system applied to the image feeds from the cameras 133. The portal focus cart 200 can have wheels 202 and one or more motor(s) such that it can be placed on the train tracks 104 and moved past the rail-side inspection assembly 101. The portal focus cart can pass the rail-side inspection assembly 101 at some speed so as to mimic a passing railcar. Various components of the portal focus cart 200 can collapse or telescope such that the portal focus cart 200 can be stored and transported more conveniently. The portal focus cart 200 can also be configured so as to set the depth of field as desired, for example through the use of multiple focusing targets 201.

The process of celebrating the one or more rail-side inspection assemblies 101 can be managed through a computing environment. For example, the inspection system 100 can include a wheel detection system that can detect the presence of a passing railcar (e.g., in this non limiting example, the passing railcar can include the portal focus cart 200). The computing environment, based on the data gathered from the wheel detection system, can measure the speed of the passing railcar. Based on the known speed of the passing railcar and the capture speeds of each camera, the computing environment can trigger the lights 151 and the cameras 133 at specific intervals such that the images captured of the passing railcar are clear and include the particular region of interest. The computing environment can employ the wheel detection system and the portal focus cart 200 to calibrate the various cameras 133 and lights 151 of the rail side inspection assemblies 101 based on the speed of the portal focus cart 200 and the known capture speeds of the camera 133.

The foregoing description of the present systems and processes has been presented only for the purposes of illustration and description and is not intended to be exhaustive or to limit the innovations to the precise forms disclosed. Many modifications and variations are possible in light of the above teaching.

The examples of the present systems and processes were chosen and described in order to explain the principles of the claimed innovations and their practical application so as to enable others skilled in the art to utilize the innovations and various examples with various modifications as are suited to the particular use contemplated. Alternative examples of the disclosed technology will become apparent to those skilled in the art to which the claimed innovations pertain without departing from their spirit and scope. Accordingly, the scope of the claimed innovations is defined by the appended claims rather than the foregoing description and the examples described therein.

What is claimed is:

1. An inspection assembly, comprising:
   a first camera angled at least partially in a vertical direction and at least partially in a horizontal direction to thereby be configured to capture images of a target region in a three-dimensional space from a first viewpoint;
   a second camera positioned apart from the first camera, angled at least partially in the vertical direction and at least partially in the horizontal direction, and directed to the target region from a second viewpoint that is different from the first viewpoint;
   one or more lights; and
   a housing comprising a base and a shroud, the housing configured to attach to one or more rail ties and to at least partially envelop the first camera and the second camera, wherein the shroud is configured to attach to a first rail tie and a second rail tie and the base is configured to attach to a third rail tie located between the first and second rail ties.

2. The inspection assembly of claim 1, wherein the shroud covers a rear of the first camera and a rear of the second camera and at least partially covers a top of the first camera and a top of the second camera.

3. The inspection assembly of claim 1, wherein:
   the base comprises a first base portion and a second base portion;
   the first base portion comprises a first bottom and one or more first sidewalls;
   the second base portion comprises a second bottom and one or more second sidewalls; and
   a second sidewall of the one or more second sidewalls nearest the one or more first sidewalls is spaced apart from the one or more first sidewalls such that a gap is formed between the first base portion and the second base portion.

4. The inspection assembly of claim 3, wherein the gap is sized to at least partially receive a rail tie.

5. The inspection assembly of claim 3, wherein the first camera is positioned in the first base portion and the second camera is positioned in the second base portion.

6. The inspection assembly of claim 3, wherein the first bottom and the second bottom are suspended above the ground when the inspection assembly is attached to rail ties.

7. The inspection assembly of claim 1, wherein:
   the first camera and two or more first lights of the one or more lights form a first imaging array; and
   the second camera and two or more second lights of the one or more lights form a second imaging array.

8. The inspection assembly of claim 7, wherein at least one of the first imaging array or the second imaging array is a linear array.

9. The inspection assembly of claim 7, wherein the housing is configured to attach to one or more rail ties at a position that is outside the rails of a railway.

10. The inspection assembly of claim 9, wherein the first camera and the second camera are configured to capture images from respective viewpoints that are at respective heights of 3 inches or less, with respect to a top surface of a rail tie to which the inspection assembly is mounted.

11. The inspection assembly of claim 1, wherein the first camera, the second camera, and the one or more lights are in communication with one or more computing devices configured to determine a capture timing for capturing images of a target component of a moving object as the target component passes through the target region.

12. The inspection assembly of claim 1, further comprising a first dampening device disposed between the first camera and the housing and a second dampening device disposed between the second camera and the housing.

13. The inspection assembly of claim 12, wherein:
   the first dampening device and the second dampening device each comprises:
      a first mounting plate configured to attach to the housing;
      a second mounting plate configured to attach to the first camera or the second camera, respectively; and
      one or more dampening structures located between the first mounting plate and the second mounting plate.

14. The inspection assembly of claim 13, wherein the one or more dampening structures comprises one or more springs.

15. An inspection system, comprising:
a plurality of inspection assemblies, each of the plurality of inspection assemblies comprising:
a first camera angled at least partially in a vertical direction and at least partially in a horizontal direction to thereby be configured to capture images of a target region in a three-dimensional space from a first viewpoint that is at a first height of 3 inches or less with respect to a top surface of one or more rail ties to which the inspection assembly is mounted;
a second camera positioned apart from the first camera, angled at least partially in the vertical direction and at least partially in the horizontal direction, and directed to the target region from a second viewpoint that is different from the first viewpoint, the second viewpoint being at a first height of 3 inches or less with respect to the top surface of the one or more rail ties to which the inspection assembly is mounted;
a first imaging array comprising the first camera and two or more first lights;
a second imaging array comprising the second camera and two or more second lights; and
a housing comprising a base and a shroud, the housing configured to attach to one or more rail ties and to at least partially envelop the first camera and the second camera, wherein:
each of the plurality of inspection assemblies is mounted to one or more rail ties at a corresponding location that is outside the rails of a railway;
a first inspection assembly of the plurality of inspection assemblies is located on a first side of the rails at a first longitudinal location along the railway; and
a second inspection assembly of the plurality of inspection assemblies is located on a second side of the rails at a second longitudinal location along the railway, the second side being opposite the first side.

16. The inspection system of claim 15, wherein the second longitudinal location is the same as the first longitudinal location.

17. The inspection system of claim 15, wherein the second longitudinal location is different from the first longitudinal location.

18. The inspection system of claim 15, further comprising:
one or more wheel detection sensors configured to detect a presence or a non-presence of a railcar wheel at a location along the railway that is upstream from the plurality of inspection assemblies; and
one or more computing devices in communication with:
the one or more wheel detection sensors; and
inspection cameras comprising the first and second cameras of each of the plurality of inspection assemblies,
wherein the one or more computing devices is configured to determine a capture timing for each of the inspection cameras based at least in part on a train speed estimation determined according to wheel detection events detected by the wheel detection sensors.

19. The inspection system of claim 18, wherein the one or more computing devices is further configured to determine the capture timing for each of the inspection cameras based on at least (i) a physical distance between the wheel detection sensors and each corresponding one of the inspection cameras and (ii) one or more electrical signal transmission or processing latencies.

20. An inspection assembly, comprising:
a first camera angled at least partially in a vertical direction and at least partially in a horizontal direction to thereby be configured to capture images of a target region in a three-dimensional space from a first viewpoint;
a second camera positioned apart from the first camera, angled at least partially in the vertical direction and at least partially in the horizontal direction, and directed to the target region from a second viewpoint that is different from the first viewpoint;
one or more lights; and
a housing comprising a base and a shroud, the housing configured to attach to one or more rail ties and to at least partially envelop the first camera and the second camera,
wherein:
the base comprises a first base portion and a second base portion;
the first base portion comprises a first bottom and one or more first sidewalls;
the second base portion comprises a second bottom and one or more second sidewalls;
the first camera is positioned in the first base portion and the second camera is positioned in the second base portion; and
a second sidewall of the one or more second sidewalls nearest the one or more first sidewalls is spaced apart from the one or more first sidewalls such that a gap is formed between the first base portion and the second base portion.

21. The inspection assembly of claim 20, wherein the shroud is configured to be attached to a first rail tie and a second rail tie and the base is configured to be attached to a third rail tie located between the first and second rail ties.

22. An inspection assembly, comprising:
a first camera angled at least partially in a vertical direction and at least partially in a horizontal direction to thereby be configured to capture images of a target region in a three-dimensional space from a first viewpoint;
a second camera positioned apart from the first camera, angled at least partially in the vertical direction and at least partially in the horizontal direction, and directed to the target region from a second viewpoint that is different from the first viewpoint;
a first imaging array comprising the first camera and two or more first lights;
a second imaging array comprising the second camera and two or more second lights; and
a housing comprising a base and a shroud, the housing configured to attach to one or more rail ties and to at least partially envelop the first camera and the second camera,
wherein:
the housing is configured to attach to one or more rail ties at a position that is outside the rails of a railway; and
the first camera and the second camera are configured to capture images from respective viewpoints that are at respective heights of 3 inches or less, with respect to a top surface of a rail tie to which the inspection assembly is mounted.

* * * * *